United States Patent
Elfadli

(10) Patent No.: US 11,041,409 B2
(45) Date of Patent: Jun. 22, 2021

(54) COMBINED CYCLE POWER PLANT HAVING CONDENSATE RECIRCULATION PUMP USING VENTURI EFFECT

(71) Applicant: SIEMENS ENERGY, INC., Orlando, FL (US)

(72) Inventor: Mohamed Elfadli, Orlando, FL (US)

(73) Assignee: Siemens Energy, Inc., Orlando, FL (US)

(*) Notice: Subject to any disclaimer, the term of this patent is extended or adjusted under 35 U.S.C. 154(b) by 162 days.

(21) Appl. No.: 16/094,505

(22) PCT Filed: May 23, 2016

(86) PCT No.: PCT/US2016/033743
§ 371 (c)(1),
(2) Date: Oct. 18, 2018

(87) PCT Pub. No.: WO2017/204780
PCT Pub. Date: Nov. 30, 2017

(65) Prior Publication Data
US 2019/0101028 A1    Apr. 4, 2019

(51) Int. Cl.
| *F01K 23/10* | (2006.01) |
| *F01K 9/02* | (2006.01) |
| *F22B 37/02* | (2006.01) |

(52) U.S. Cl.
CPC ............ *F01K 23/10* (2013.01); *F01K 9/02* (2013.01); *F22B 37/025* (2013.01); *Y02E 20/16* (2013.01)

(58) Field of Classification Search
CPC . F01K 9/02; F01K 23/10; Y02E 20/16; F02C 6/08; F22B 37/025
See application file for complete search history.

(56) References Cited

U.S. PATENT DOCUMENTS

2010/0263605 A1* 10/2010 Sengar .................. F22G 5/18
                                                              122/31.1
2012/0255304 A1    10/2012 Li et al.

FOREIGN PATENT DOCUMENTS

| DE | 19834196 A1 | 2/1999 |
| DE | 102013204396 A1 | 9/2014 |
| FR | 976227 A | 3/1951 |
| FR | 3025831 A1 | 3/2016 |
| GB | 1041919 A | 9/1966 |
| JP | S489841 | 3/1973 |
| JP | H07208400 A | 8/1995 |

(Continued)

OTHER PUBLICATIONS

PCT International Search Report and Written Opinion dated Feb. 1, 2017 corresponding to PCT Application No. PCT/US2016/033743 filed May 23, 2016.

*Primary Examiner* — Katheryn A Malatek

(57) ABSTRACT

A combined cycle power plant and a method for operating a combined cycle power plant are presented. The combined cycle power plant includes a condensate recirculation pump to recirculate flow medium from downstream of a condensate preheater system to upstream of the condensate preheater system. An adequate flow temperature at the upstream of the condensate preheater system may be maintained to prevent acid gas dew point corrosion. The condensate recirculation pump may use a venturi effect to convert a high pressure of a condensate supplied by a condensate extraction pump to a suction pressure for the recirculation.

12 Claims, 3 Drawing Sheets

(56) References Cited

FOREIGN PATENT DOCUMENTS

| | | | |
|---|---|---|---|
| JP | H10227203 | A | 8/1998 |
| JP | 2001033004 | A | 2/2001 |
| JP | 2002130200 | A | 5/2002 |
| JP | 2009127873 | A | 6/2009 |
| JP | 2011137448 | A | 7/2011 |

* cited by examiner

COMBINED CYCLE POWER PLANT HAVING CONDENSATE RECIRCULATION PUMP USING VENTURI EFFECT

FIELD OF THE INVENTION

This invention relates generally to a combined cycle power plant having a condensate recirculation pump using a venturi effect.

DESCRIPTION OF THE RELATED ART

A combined cycle power plant may consist of one or more gas turbines generating power output from combustion of a fuel and air mixture. The fuel may include oil or gas. One or more heat recovery steam generators may be located downstream from the gas turbines to receive exhaust gas from the gas turbines. The heat recovery steam generators may extract energy from the exhaust gas to produce steam. The steam may be transferred to a steam turbine for generating additional power output. The heat recovery steam generator may include multiple pressure steam systems, such as a high pressure steam system, an intermediate pressure system and a low pressure steam system. The heat recovery steam generator may include an exhaust stack that dumps the exhaust gas after passing through the multiple pressure steam systems. A steam turbine may consist of multiple pressure steam turbines, such as a high pressure stream turbine, an intermediate pressure steam turbine, and a low pressure steam turbine. A condenser may be located at an exit of the steam turbine. The heat recovery steam generator may include a condensate preheater system. Water from the condenser may be returned to the condensate preheater system. The condensate preheater system preheats the condensate and feeds the preheated condensate into the multiple pressure steam systems for generating the steam.

In a combined cycle power plant, an adequate temperature may need to be maintained at an exhaust end of the heat recovery steam generator to prevent acid gas dew point corrosion. The temperature may depend on sulfur content in a fuel oil or gas. The temperature may depend on type of a fuel oil or gas. Temperature of flow medium at downstream of the condensate preheater system may be higher than temperature of the condensate at upstream of the condensate preheater system. The flow medium from the downstream of the condensate preheater system may be recirculated back to the upstream of the condensate preheater system to mix with the condensate so that an adequate temperature may be maintained at the upstream of the condensate preheater system. A condensate recirculation pump may be used to recirculate the flow medium. The condensate recirculation pump may be a motor driven pump. Additional foundation interfaces, wiring, piping, minimal flow line, and automatic recirculation valve may be required for the motor driven condensate recirculation pump.

SUMMARY OF THE INVENTION

Briefly described, aspects of the present invention relate to a combined cycle power plant having a condensate recirculation pump using a venturi effect.

According to an aspect, a combined cycle power plant is presented. The combined cycle power plant comprises a gas turbine that is configured to generate power output and produce exhaust gas. The combined cycle power plant comprises a heat recovery steam generator that is configured to receive the exhaust gas from the gas turbine and produce steam by extracting energy from the exhaust gas. The combined cycle power plant comprises a steam turbine that is configured to receive the steam produced in the heat recovery steam generator to generate power output. The combined cycle power plant comprises a condenser that is configured to receive condensate from the steam turbine. The heat recovery steam generator comprises a condensate extraction pump that is configured to extract the condensate from the condenser. The heat recovery steam generator comprises a condensate preheater system arranged downstream of the condensate extraction pump that is configured to preheat the condensate. The heat recovery steam generator comprises a condensate recirculation pump that is configured to recirculate flow medium from downstream of the condensate preheater system to upstream of the condensate preheater system to maintain a temperature of the condensate at the upstream of the condensate preheater system at a predetermined temperature. The condensate recirculation pump comprises a suction zone formed by a venturi effect for the recirculation.

According to an aspect, a method for operating a combined cycle power plant is presented. The combined cycle power plant comprises a gas turbine, a heat recovery steam generator, and a steam turbine. The method comprises operating the gas turbine to generate power output and produce exhaust gas. The method comprises operating the gas turbine to generate power output and produce exhaust gas. The method comprises producing steam in the heat recovery steam generator by extracting energy from the exhaust gas. The method comprises operating the steam turbine to generate power output from the steam produced in the heat recovery steam generator. The method comprises receiving condensate from the steam turbine to the condenser. The heat recovery steam generator comprises a condensate exaction pump, a condensate preheater system arranged downstream of the condensate exaction pump, and a condensate recirculation pump. The method comprises extracting the condensate from the condenser by the condensate exaction pump. The method comprises preheating the condensate in the condensate preheater system. The method comprises recirculating flow medium from downstream of the condensate preheater system to upstream of the condensate preheater system by the condensate recirculation pump. The condensate recirculation pump comprises a suction zone formed by a venturi effect for the recirculation. The method comprises maintaining a temperature of the condensate at the upstream of the condensate preheater system at a predetermined temperature by mixing the flow medium from the downstream of the condensate preheater system with the condensate extracted from the condenser.

According to an aspect, a heat recovery steam generator in a combined cycle power plant is presented. The combined cycle power plant comprises a gas turbine, a steam turbine, and a condenser. The heat recovery steam generator comprises a condensate extraction pump that is configured to extract the condensate from the condenser. The heat recovery steam generator comprises a condensate preheater system arranged downstream of the condensate extraction pump that is configured to preheat the condensate. The heat recovery steam generator comprises a condensate recirculation pump that is configured to recirculate flow medium from downstream of the condensate preheater system to upstream of the condensate preheater system to maintain a temperature of the condensate at the upstream of the condensate preheater system at a predetermined temperature. The condensate recirculation pump comprises a suction zone formed by a venturi effect for the recirculation._

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
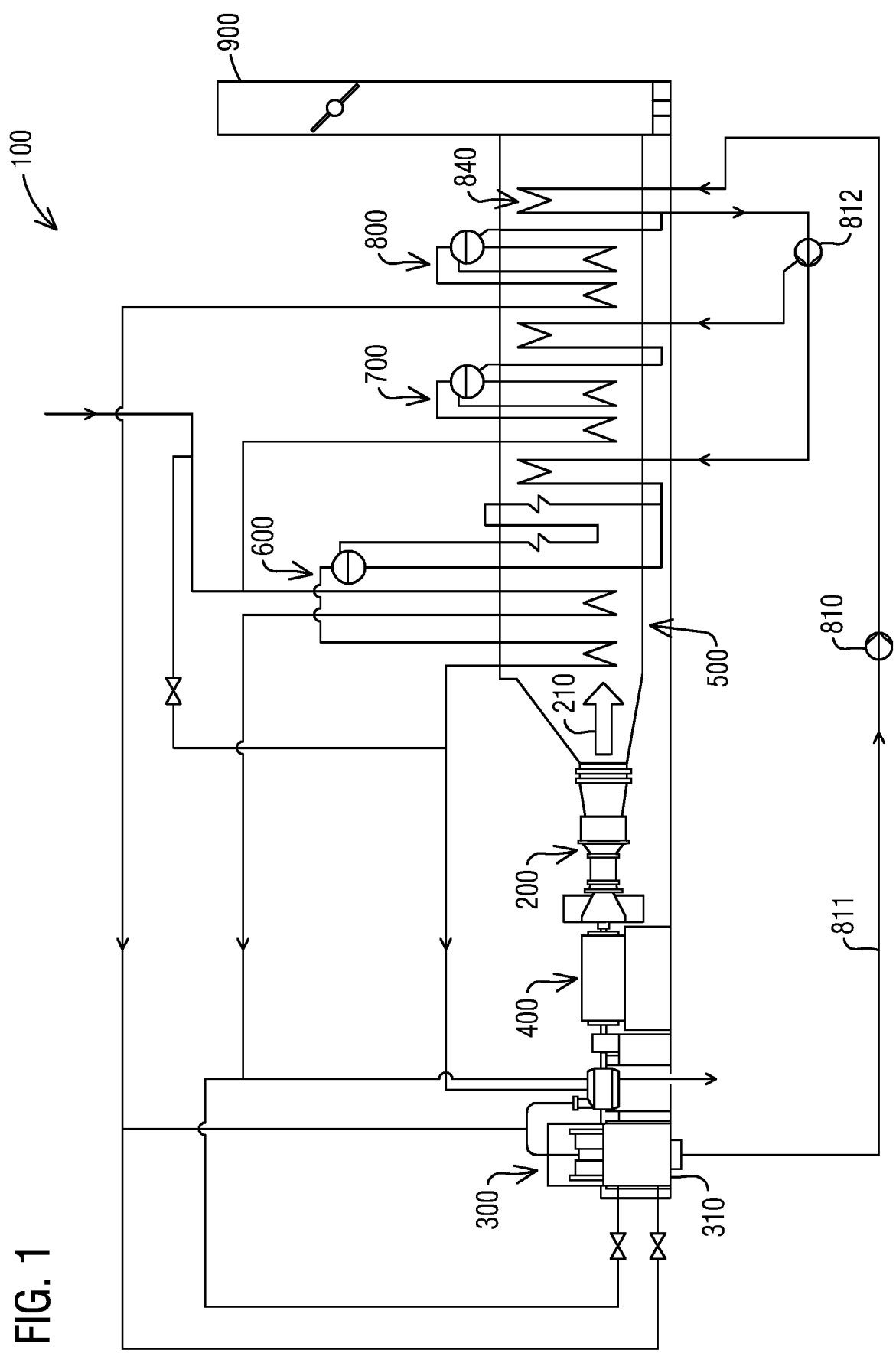
FIG. 1 illustrates a schematic diagram of a combined cycle power plant according to an embodiment.

FIG. 1 illustrates a schematic diagram of a combined cycle power plant 100 according to an embodiment. As illustrated in the exemplary embodiment of FIG. 1, the combined cycle power plant 100 may includes a gas turbine 200. The gas turbine 200 may generate power output from combustion of a fuel gas or oil and air mixture. The gas turbine 200 may connects to a generator 400 to output the power output. The gas turbine 100 may produce exhaust gas 210 at an exit of the gas turbine 200.

A combined cycle power plant 100 may include a heat recovery steam generator (HRSG) 500. The HRSG 500 may be located downstream of the gas turbine 200 and may receive the exhaust gas 210 from the gas turbine 200. According to an embodiment, a HRSG 500 may include multiple pressure steam systems. In the illustrated exemplary embodiment of FIG. 1, the HRSG 500 comprises three pressure steam systems comprising a high pressure (HP) steam system 600, an intermediate pressure (IP) steam system 700, and a low pressure (LP) steam system 800. The exhaust gas 210 flows across the HP steam system 600, the IP steam system 700, and the LP steam system 800 to produce steam by extracting energy from the exhaust gas 210. According to an embodiment, the power plant 100 may include an exhaust stack 900. The exhaust stack 900 may be arranged at an exhaust end of the HRSG 500 downstream of the LP steam system 800. The exhaust gas 210 after passing through the multiple pressure steam systems may exit the combined cycle power plant 100 via the exhaust stack 900.

A combined cycle power plant 100 may include a steam turbine 300. The steam turbine 300 may receive the steam generated in the HRSG 500 to produce power output. According to an embodiment, a combined cycle power plant 100 may be in a single shaft configuration, or in a multi-shaft configuration. The combined cycle power plant 100 as illustrated in FIG. 1 is in a single shaft configuration, where the gas turbine 200 and the steam turbine 300 are connected to a common generator 400. In a multi-shaft configuration, a gas turbine 200 and a steam turbine 300 may be connected to separate generators respectively.

A condenser 310 may be located at an exit of the steam turbine 300. Water from the condenser 310 may be returned to a condensate preheater 840 of a HRSG 500 via a condensate line 811 with an aid of a condensate extraction pump 810. A boiler feed pump 812 may located downstream of the condensate preheater 840 to feed water into a HP steam system 600 and an IP steam system 700.

Figure 2:
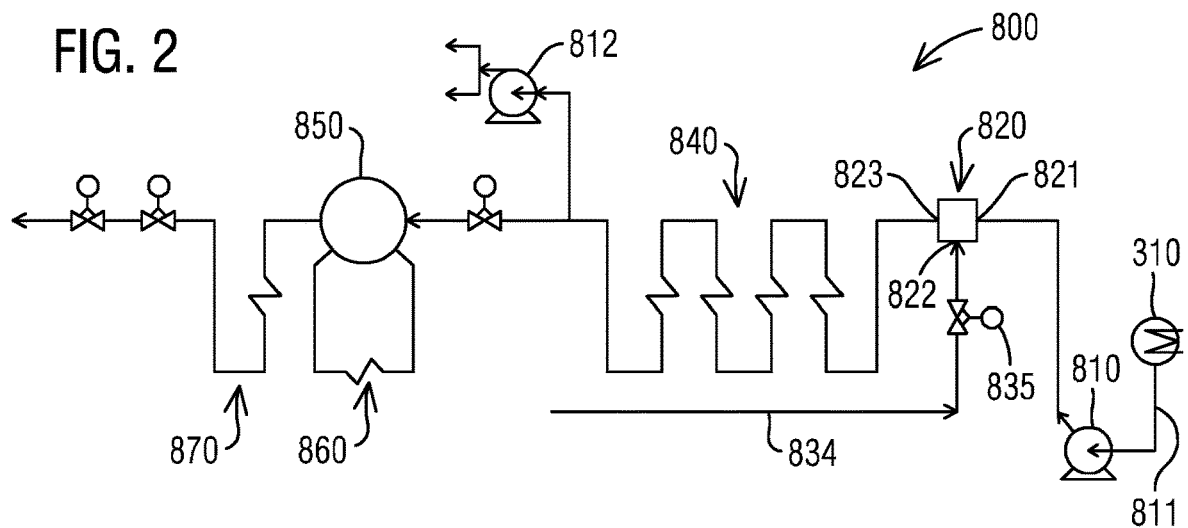
FIG. 2 illustrates a schematic diagram of a low pressure steam system of a heat recovery steam generator according to an embodiment.

FIG. 2 illustrates a schematic diagram of a LP steam system 800 of a heat recovery steam generator 500 according to an embodiment. As illustrated in the exemplary embodiment of FIG. 2, a condensate extraction pump 810 may be connected to a condenser 310 via a condensate line 811. A condensate preheater system 840 may be arranged downstream of the condensate extraction pump 810. The condensate extraction pump 810 may extract condensate from the condenser 310. The extracted condensate may be entered into the condensate preheater system 840. According to an embodiment, the LP steam system 800 comprises a LP evaporator 860 located downstream of the condensate preheater 840, and a LP superheater 870 located downstream of the LP evaporator 860. The LP steam system 800 comprises a LP drum 850 that may be connected to the LP evaporator 860.

According to an embodiment, an adequate temperature may need to be maintained at an exhaust end of the HRSG 500 to prevent acid gas dew point corrosion. The adequate temperature may be predetermined based on sulfur content in a fuel oil or gas. The adequate temperature may be predetermined based on type of a fuel oil or gas. For example, a predetermined value of the adequate temperature may be in a range between 30° C. and 150° C., or between 40° C. and 140° C., or between 50° C. and 130° C. Temperature of flow medium at downstream of the condensate preheater system 840 may be higher than temperature of the condensate at upstream of the condensate preheater system 840. The flow medium from the downstream of the condensate preheater system 840 may be recirculated back to the upstream of the condensate preheater system 840 to mix with the condensate so that the adequate temperature may be maintained at the upstream of the condensate preheater system 840. According to an embodiment, a condensate recirculation pump 820 may be used to recirculate the flow medium.

As illustrated in the exemplary embodiment of FIG. 2, a condensate recirculation pump 820 comprises a condensate inlet 821. The condensate inlet 821 may be operatively connected to the condensate extraction pump 810. The condensate extraction pump 810 may extract condensate from the condenser 310. The condensate extraction pump 810 may pump the extracted condensate into the condensate recirculation pump 820 through the condensate inlet 821.

A condensate recirculation pump 820 comprises a suction inlet 822. The suction inlet 822 may be operatively connected to downstream of the condensate preheater system 840 via a suction line 834. Flow medium from the downstream of the condensate preheater system 840 may be recirculated into the condensate recirculation pump 820 through the suction inlet 822 as a suction flow.

A condensate recirculation pump 820 comprises an outlet 823. The outlet 823 may be operatively connected to upstream of the condensate preheater system 840. Suction flow entering through the suction inlet 822 may be mixed with condensate entering through the condensate inlet 821 in the condensate recirculation pump 820. Mixed flow of the condensate and the suction flow may be discharged into the condensate preheater system 840 through the outlet 823.

A condensate recirculation pump 820 comprises a flow control valve 835. The flow control valve 835 may be used to control flow entering into the condensate recirculation pump 820 so that a temperature at the outlet 823 may be maintained at a predetermined value. According to an embodiment, the flow control valve 835 may be used to control condensate entering into the condensate recirculation pump 820 through a condensate inlet 821. According to an embodiment, the flow control valve 835 may be used to control suction flow entering into the condensate recirculation pump 820 through a suction inlet 822. According to an embodiment, the flow control valve 835 may be arranged at a location that may optimize flow control. In the illustrated exemplary embodiment of FIG. 2, the flow control valve 835 may be located at the suction line 834 prior to the suction inlet 822.

A suction flow from downstream of the condensate preheater system 840 may enter into a condensate recirculation pump 820 via a suction line 834. According to an embodiment, the suction flow from downstream of the condensate preheater system 840 may include water. For example, the suction flow may include water from LP steam system 800, or water from IP steam system 700, or water from HP steam system 600. According to an embodiment, the suction flow from downstream of the condensate preheater system 840 may include steam. For example, the suction flow may include steam from LP steam system 800, or steam from IP steam system 700, or steam from HP steam system 600.

Figure 3:
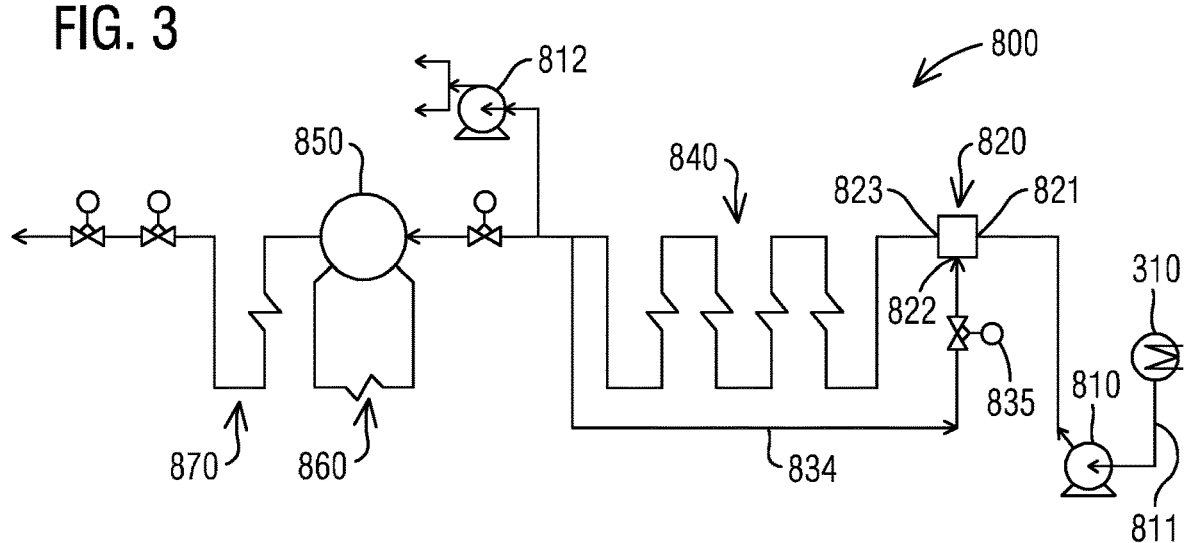
FIG. 3 illustrates a schematic diagram of a low pressure steam system of a heat recovery steam generator according to an embodiment, wherein water at outlet of a condensate preheater system may be used as a suction flow.

FIG. 3 illustrates a schematic diagram of a LP steam system 800 of a HRSG 500 according to an embodiment. According to the illustrated exemplary embodiment of FIG. 3, water from outlet of a condensate preheater system 840 may be used as a suction flow entering into a condensate recirculation pump 820.

Figure 4:
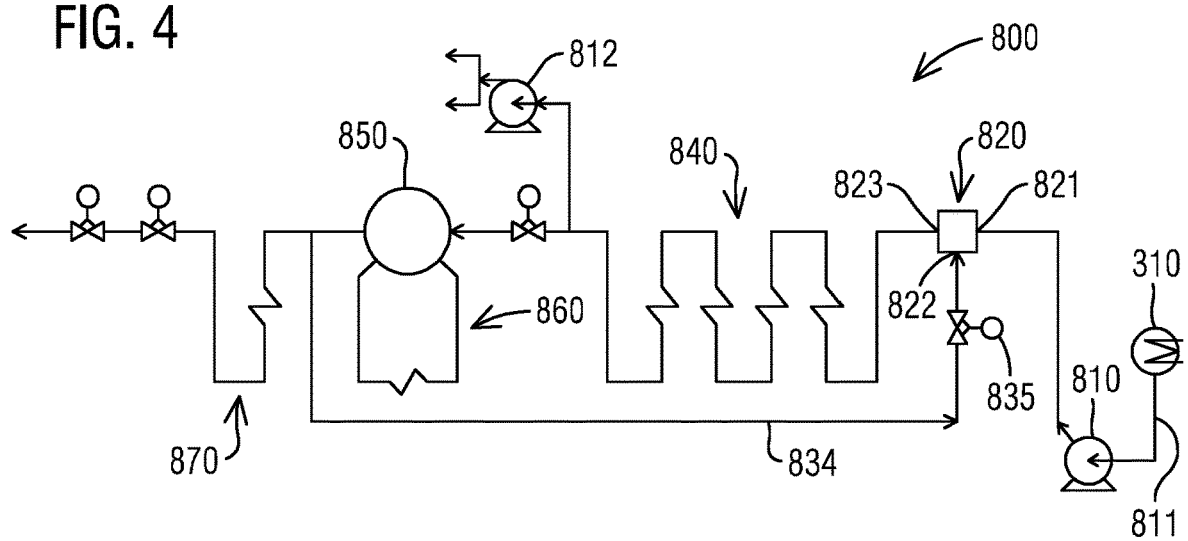
FIG. 4 illustrates a schematic diagram of a low pressure steam system of a heat recovery steam generator according to an embodiment, wherein steam at outlet of low pressure steam system may be used as a suction flow.

FIG. 4 illustrates a schematic diagram of a LP steam system 800 of a HRSG 500 according to an embodiment. According to the illustrated exemplary embodiment of FIG. 4, steam from outlet of a LP evaporator 850 may be used as a suction flow entering into a condensate recirculation pump 820.

Figure 5:
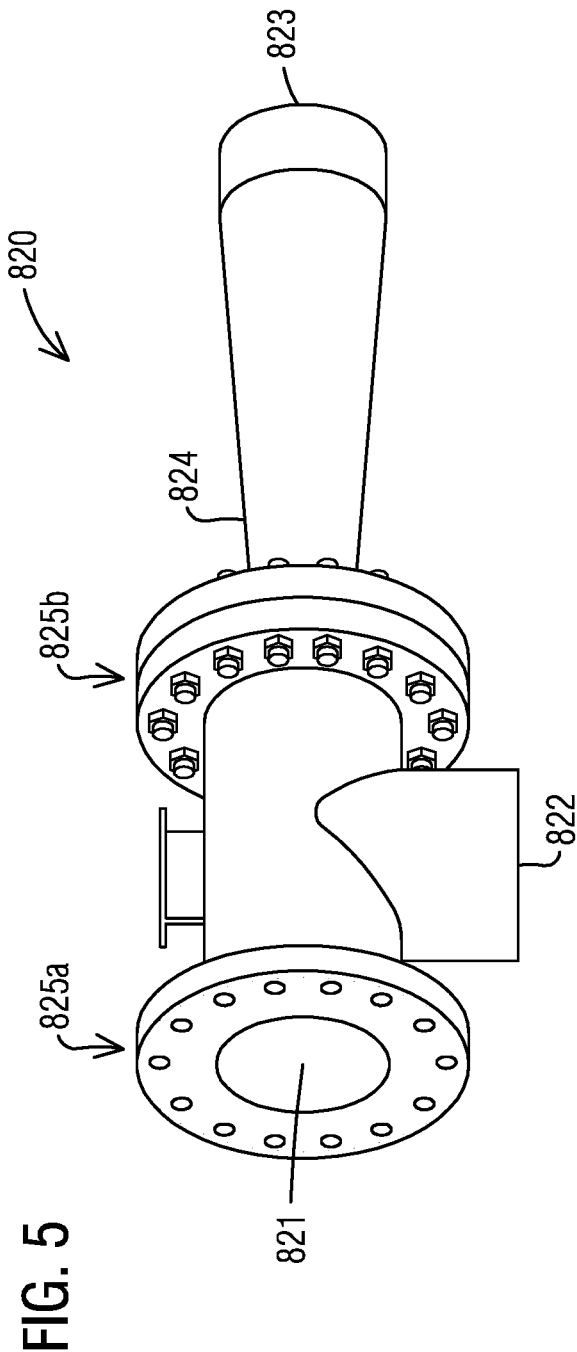
FIG. 5 illustrates a perspective schematic view of a condensate recirculation pump according to an embodiment.

FIG. 5 illustrates a perspective schematic view of a condensate recirculation pump 820 according to an embodiment. According to the illustrated exemplary embodiment of FIG. 5, the condensate recirculation pump 820 comprises a pipe 824. A condensate inlet 821 may be arranged at one end of the pipe 824. An outlet 823 may be arranged at another end of the pipe 824. A suction inlet 822 may be arranged at the pipe 824 closer to the condensate inlet 821. According to an embodiment, the condensate inlet 821 may be connected to a condensate extraction pump 810 via a connecting device, for exemplary, a flange 825a. The pipe 824 may include a plurality of separate pipes connecting via a connecting device, for exemplary, a flange 825b. Condensate may enter into the condensate recirculation pump 820 through the condensate inlet 821. Suction flow may enter into the condensate recirculation pump 820 through the suction inlet 822. The condensate may mix with the suction flow in the pipe 824 such that a mixed flow of the condensate and the suction flow may maintain a predetermined temperature. The mixed flow of the condensate and the suction flow may be discharged through the outlet 823 into a condensate preheater system 840 at the predetermined temperature so that acid gas dew point corrosion may be prevented at upstream of the condensate preheater system 840.

Figure 6:
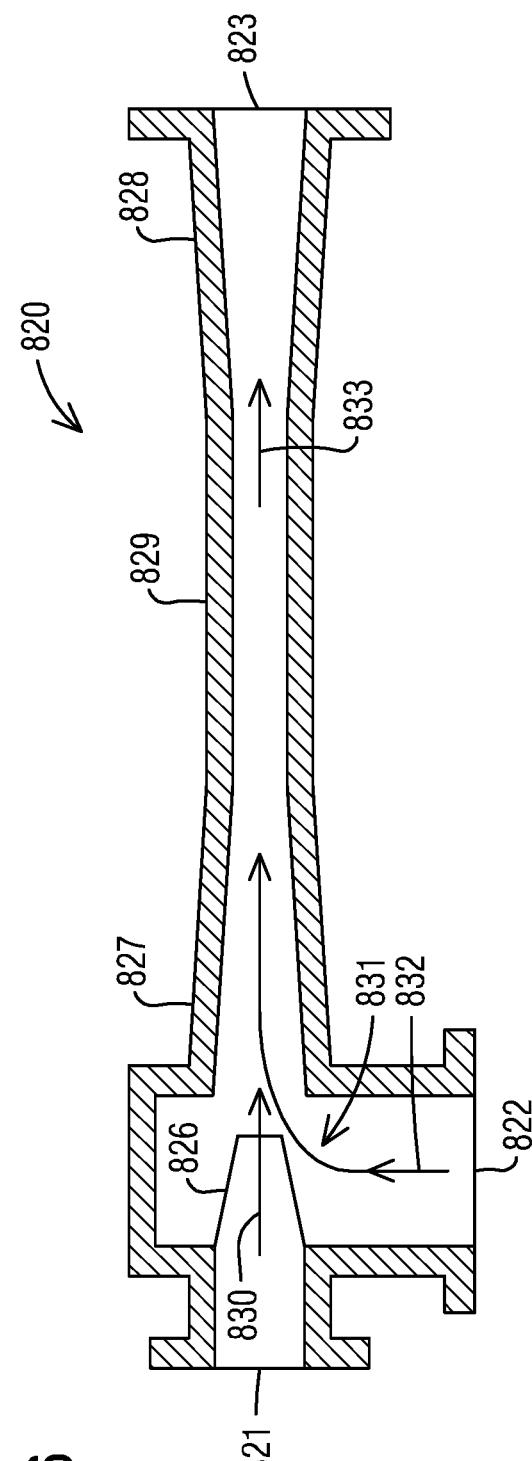
FIG. 6 illustrates a schematic cross section view of a condensate recirculation pump according to an embodiment.

FIG. 6 illustrates a schematic cross section view of a condensate recirculation pump 820 according to an embodiment. According to the illustrated exemplary embodiment of FIG. 6, the condensate recirculation pump 820 comprises a motive fluid nozzle 826 arranged at a condensate inlet 821. Condensate extraction pump 810 may pumps condensate as a motive flow 830 entering into the motive fluid nozzle 826. The condensate recirculation pump 820 comprises a converging nozzle 827 downstream of the motive fluid nozzle 826. A velocity of the motive flow 830 may increase when flowing through the converging nozzle 827. A pressure of the motive flow 830 may decrease when flowing through the converging nozzle 827 due to a venturi effect. The venturi effect may convert pressure energy of the motive flow 830 to kinetic energy. The venturi effect may create a suction zone 831 in the condensate recirculation pump 820. According to an embodiment, the suction zone 831 may has a low pressure, such as vacuum.

Referring to FIG. 2, a suction inlet 822 of the condensate recirculation pump 820 may be connected to downstream of the condensate preheater system 840. According to the illustrated exemplary embodiment of FIG. 6, the suction zone 831 may entrain flow medium downstream of the condensate preheater system 840 as a suction flow 832 entering into the condensate recirculation pump 820 through the suction inlet 822. The suction flow 832 of the flow medium downstream of the condensate preheater system 840 may mix with the motive flow 830 of the condensate in the condensate recirculation pump 820 to form a mixed flow 833.

According to an illustrated exemplary embodiment of FIG. 6, the condensate recirculation pump 820 comprises a diverging nozzle 828 arranged downstream of the converging nozzle 827. A velocity of the mixed flow 833 may decrease when flowing through the diverging nozzle 828. A pressure of the mixed flow 830 may increase when flowing through the diverging nozzle 828 due to a venturi effect. The venturi effect may covert kinetic energy of the mixed flow 833 to pressure energy.

Referring to FIG. 2, an outlet 823 of the condensate recirculation pump 820 may be connected to upstream of the condensate preheater system 840. According to an illustrated exemplary embodiment of FIG. 6, the outlet 823 may be located at an exit of the diverging nozzle 828. The mixed flow 833 may be discharged from the condensate recirculation pump 820 into the condensate preheater system 840 through the outlet 823. According to an embodiment, temperature of the suction flow 832 of the flow medium downstream of the condensate preheater system 840 may be higher than temperature of the motive flow 830 of the condensate. The mixed flow 833 may be discharged into the condensate preheater system 840 at a predetermined temperature to prevent acid gas dew point corrosion.

According to an illustrated exemplary embodiment of FIG. 6, the condensate recirculation pump 820 comprises a chamber 829 arranged between the converging nozzle 827 and the diverging nozzle 828. The chamber 829 may be a cylindrical pipe. Mixed flow 833 may pass through the chamber 829 before entering into the diverging nozzle 828.

According to an embodiment, a flow ratio M of the condensate recirculation pump 820 may be defined as flowing:

$$M = \frac{Q_s}{Q_m}$$

Where: $Q_s$ represents flow rate of the suction flow, and $Q_m$ represents flow rate of the motive flow.

According to an embodiment, a pressure ratio N of the condensate recirculation pump 820 may be defined as flowing:

$$N = \frac{(P_e - P_s)}{(P_m - P_e)}$$

Where: $P_e$ represents exit pressure,
$P_s$ represents suction pressure, and
$P_m$ represents motive pressure.

According to an embodiment, an efficiency η of the condensate recirculation pump 820 may be defined as flowing:

$$\varsigma = M \times N$$

A converging nozzle 827 of a condensate recirculation pump 820 may convert a high motive pressure $P_m$ of a motive flow 830, for example, a condensate from the condensate extraction pump 810, to create a low suction pressure $P_s$ using a venturi effect, such as vacuum. The low suction pressure $P_s$ may draw a suction flow 832 from downstream of the condensate preheater system 840 into the condensate recirculation pump 820. The motive flow 830 and the suction flow 832 may be mixed in the condensate recirculation pump 820 to form a mixed flow 833. According to an embodiment, a diverging nozzle 828 of a condensate recirculation pump 820 may reduce a velocity of the mixed flow 833 to increase the low suction pressure $P_s$ to an exit pressure $P_e$ using a venturi effect. According to an embodiment, a high temperature of the suction flow 832 from downstream of the condensate preheater system 840 may be mixed with a low temperature of the motive flow 830 of the condensate to provide a predetermined adequate flow temperature to the condensate preheater system 840.

According to an aspect, the illustrated embodiments present a combined cycle power plant 100 and a method for operating the combined cycle power plant 100. The combined cycle power plant 100 comprises a condensate recirculation pump 820. The condensate recirculation pump 820 uses a venturi effect to recirculate flow medium from downstream of a condensate preheater system 840 to upstream of the condensate preheater system 840 to maintain an adequate flow temperature at upstream of the condensate preheater system 840. According to an aspect, the disclosed condensate recirculation pump 820 may include a jet pump, an educator pump, an injector pump, an ejector pump, or a venturi pump.

According to an aspect, the disclosed condensate recirculation pump 820 may eliminate additional foundations interfaces that may be required for a motor driven condensate recirculation pump. The disclosed condensate recirculation pump 820 may reduce a construction cost of the combined cycle power plant 100.

According to an aspect, the disclosed condensate recirculation pump 820 may require less installation space than a motor driven condensate recirculation pump. The illustrated condensate recirculation pump 820 may be installed at locations that may best fit into a layout of a combined cycle power plant 100.

According to an aspect, the disclosed condensate recirculation pump 820 may eliminate additional wiring, piping, minimal flow line, and automatic recirculation valve that may be required for a motor driven condensate recirculation pump. The proposed condensate recirculation pump 820 may require less maintenance cost than a motor driven condensate recirculation pump.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 Combined Cycle Power Plant
200 Gas Turbine
210 Exhaust Gas from Gas Turbine
300 Steam Turbine
310 Condenser
400 Generator
500 Heat Recovery Steam Generator (HRSG)
600 High Pressure (HP) Steam System of HRSG
700 Intermediate Pressure (IP) Steam System of HRSG
800 Low Pressure (LP) Steam System of HRSG
810 Condensate Extraction Pump
811 Condensate Line
812 Boiler Feed Pump
820 Condensate Recirculation Pump
821 Condensate Inlet
822 Suction Inlet
823 Outlet of the Condensate Recirculation Pump
824 Pipe of the Condensate Recirculation Pump
825a, 825b Flange
826 Motive Fluid Nozzle
827 Converging Nozzle
828 Diverging Nozzle
829 Chamber
830 Motive Flow
831 Suction Zone
832 Suction Flow
833 Mixed Flow
834 Suction Line
835 Flow Control Valve
840 Condensate Preheater System
850 LP Drum
860 LP Evaporator 870 LP Superheater
900 Exhaust Stack

What is claimed is:

1. A combined cycle power plant comprising:
a gas turbine that is configured to generate power output and produce exhaust gas;
a heat recovery steam generator that is configured to receive the exhaust gas from the gas turbine and produce steam by extracting energy from the exhaust gas;
a steam turbine that is configured to receive the steam produced in the heat recovery steam generator and generate power output; and
a condenser positioned at an exit of the steam turbine to receive condensate from the steam turbine,
wherein the heat recovery steam generator comprises:
    a condensate extraction pump that is configured to extract the condensate from the condenser;
    a condensate preheater system arranged downstream of the condensate extraction pump that is configured to preheat the condensate; and
    a condensate recirculation pump that is configured to recirculate flow medium from downstream of the condensate preheater system to upstream of the condensate preheater system to maintain a temperature of the condensate at the upstream of the condensate preheater system at a predetermined temperature,
wherein the condensate recirculation pump comprises a suction zone formed by a venturi effect for the recirculation,
wherein the condensate recirculation pump comprises a condensate inlet operatively connected to the condensate extraction pump, wherein the condensate is pumped into the condensate recirculation pump through the condensate inlet, and
wherein a motive fluid nozzle is arranged at the condensate inlet such that after condensate enters the condensate recirculation pump through condensate inlet it flows through the motive fluid nozzle,
wherein the condensate recirculation pump comprises a converging nozzle, wherein the converging nozzle is configured to create the suction zone by converting pressure energy of the condensate to kinetic energy, and
wherein the condensate recirculation pump comprises a suction inlet operatively connected to and downstream of the condensate preheater system, wherein the flow medium from downstream of the condensate preheater system is drawn into the condensate recirculation pump through the suction inlet and mixed with the condensate to form a mixed flow.

2. The combined cycle power plant as claimed in claim 1, wherein the condensate recirculation pump comprises a diverging nozzle arranged downstream of the converging nozzle, wherein the diverging nozzle is configured to increase a pressure of the mixed flow.

3. The combined cycle power plant as claimed in claim 2, wherein the condensate recirculation pump comprises an outlet located at an exit of the diverging nozzle, wherein the outlet is operatively connected to a point upstream of the condensate preheater system, wherein the mixed flow is discharged from the condensate recirculation pump into the condensate preheater system through the outlet at the predetermined temperature.

4. The combined cycle power plant as claimed in claim 2, wherein the condensate recirculation pump comprises a chamber arranged between the converging nozzle and the diverging nozzle.

5. The combined cycle power plant as claimed in claim 1, wherein the flow medium from downstream of the condensate preheater system comprises water.

6. The combined cycle power plant as claimed in claim 1, wherein the flow medium from downstream of the condensate preheater system comprises steam.

7. The combined cycle power plant as claimed in claim 1, further comprising a flow control valve operatively connected to the condensate recirculation pump.

8. The method as claimed in claim 1, wherein the method comprising recirculating water from downstream of the condensate preheater system.

9. The method as claimed in claim 1, wherein the method comprising recirculating steam from downstream of the condensate preheater system.

10. A method for operating a combined cycle power plant, wherein the combined cycle power plant comprises a gas turbine, a heat recovery steam generator, a steam turbine and a condenser, the method comprising:
operating the gas turbine to generate power output and produce exhaust gas;
producing steam in the heat recovery steam generator by extracting energy from the exhaust gas;
operating the steam turbine to generate power output from the steam produced in the heat recovery steam generator; and
positioning the condenser at an exit of the steam turbine so that condensate is directly received from the steam turbine to the condenser,
wherein the heat recovery steam generator comprises a condensate exaction pump, a condensate preheater system arranged downstream of the condensate exaction pump, and a condensate recirculation pump,
wherein the method further comprises:
    extracting the condensate from the condenser by the condensate exaction pump;
    preheating the condensate in the condensate preheater system;
    recirculating flow medium from downstream of the condensate preheater system to upstream of the condensate preheater system by the condensate recirculation pump, wherein the condensate recirculation pump comprises a suction zone formed by a venturi effect for the recirculation; and
    maintaining a temperature of the condensate at the upstream of the condensate preheater system at a predetermined temperature by mixing the flow medium from downstream of the condensate preheater system with the condensate extracted from the condenser,
wherein the condensate recirculation pump comprises a condensate inlet operatively connected to the condensate extraction pump, wherein the method comprising pumping the condensate into the condensate recirculation pump through the condensate inlet by the condensate extraction pump,
wherein the condensate recirculation pump comprises a converging nozzle, wherein the method comprising creating the suction zone by converting pressure energy of the condensate to kinetic energy when flowing through the converging nozzle,
wherein the condensate recirculation pump comprises a suction inlet operatively connected to and downstream of the condensate preheater system, wherein the method comprising drawing the flow medium from downstream of the condensate preheater system into the condensate recirculation pump through the suction inlet and mixing with the condensate to form a mixed flow.

11. The method as claimed in claim 10, wherein the condensate recirculation pump comprises a diverging nozzle arranged downstream of the converging nozzle, wherein the method comprising increasing a pressure of the mixed flow when flowing through the diverging nozzle.

12. The method as claimed in claim 11, wherein the condensate recirculation pump comprises an outlet at an exit of the diverging nozzle, wherein the outlet is operatively connected to a point upstream of the condensate preheater system, wherein the method comprising discharging the mixed flow from the condensate recirculation pump into the condensate preheater system through the outlet at the predetermined temperature.

* * * * *